United States Patent
Wang

(10) Patent No.: US 9,583,048 B2
(45) Date of Patent: Feb. 28, 2017

(54) LIGHT GUIDE PLATE, DUAL-VIEW BACKLIGHT MODULE AND DUAL-VIEW DISPLAY DEVICE

(71) Applicant: BOE TECHNOLOGY GROUP CO., LTD., Beijing (CN)

(72) Inventor: Shang Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 17 days.

(21) Appl. No.: 14/471,586

(22) Filed: Aug. 28, 2014

(65) Prior Publication Data
US 2015/0331168 A1    Nov. 19, 2015

(30) Foreign Application Priority Data
May 19, 2014  (CN) .......................... 2014 1 0212128

(51) Int. Cl.
*F21V 8/00*   (2006.01)
*G09G 3/34*   (2006.01)
(Continued)

(52) U.S. Cl.
CPC ........... *G09G 3/3406* (2013.01); *G02B 6/003* (2013.01); *G02B 6/0031* (2013.01);
(Continued)

(58) Field of Classification Search
CPC .............. G02B 6/0038; G02B 27/2235; G02B 27/2242; H04N 13/0445; H04N 13/0447; H04N 13/045
See application file for complete search history.

(56) References Cited

U.S. PATENT DOCUMENTS 5,210,643 A * 5/1993 Fujii .................. G02B 27/1006
                                                          359/618
5,539,487 A * 7/1996 Taguchi ................. G02B 3/005
                                                          348/E13.008
(Continued)

FOREIGN PATENT DOCUMENTS

CN     101101349 A     1/2008
CN     101126859 A     2/2008
(Continued)

OTHER PUBLICATIONS

First Chinese Office Action and English translation dated Dec. 24, 2015, for corresponding Chinese Application No. 201410212128.4.
(Continued)

*Primary Examiner* — Anh Mai
*Assistant Examiner* — Steven Horikoshi
(74) *Attorney, Agent, or Firm* — Kinney & Lange, P.A.

(57) ABSTRACT

A light guide plate, a dual-view backlight module having the light guide plate and a dual-view display device having the dual-view backlight module are provided. A lower surface of the light guide plate includes at least one V-shaped groove configured to reflect a light ray, which is incident onto the lower surface of the light guide plate from sides thereof, onto an upper surface of the light guide plate by sides of the at least one V-shaped groove, the reflected light ray leaving the light guide plate from the upper surface thereof. The V-shaped groove on the light guide plate refracts the light from the two sides of the V-shaped groove, so that the light leaving the upper surface of the light guide plate can form dual-view backlight with a good brightness enhancement effect and a dual-view display having a high brightness can be manufactured.

16 Claims, 5 Drawing Sheets

(51) Int. Cl.
*G02B 26/12* (2006.01)
*G02B 27/12* (2006.01)
*G02B 3/06* (2006.01)
*G02B 3/00* (2006.01)
*G02B 5/10* (2006.01)
*G02B 5/04* (2006.01)
*G02B 27/30* (2006.01)

(52) U.S. Cl.
CPC ......... *G02B 6/0038* (2013.01); *G02B 6/0051* (2013.01); *G02B 6/0066* (2013.01); *G02B 6/0068* (2013.01); *G02B 26/126* (2013.01); *G02B 27/123* (2013.01); *G02B 27/126* (2013.01); *G02B 3/0006* (2013.01); *G02B 3/06* (2013.01); *G02B 5/04* (2013.01); *G02B 5/10* (2013.01); *G02B 26/12* (2013.01); *G02B 27/30* (2013.01)

(56) References Cited

U.S. PATENT DOCUMENTS

| | | | | |
|---|---|---|---|---|
| 5,897,184 | A * | 4/1999 | Eichenlaub | G02B 6/0031 348/E13.029 |
| 2002/0180711 | A1* | 12/2002 | Umemoto | G02B 6/0036 345/173 |
| 2004/0239832 | A1 | 12/2004 | Saito | |
| 2006/0222041 | A1* | 10/2006 | Moriwaka | B23K 26/0648 372/101 |
| 2006/0268571 | A1* | 11/2006 | Harada | G02B 6/0038 362/607 |
| 2007/0139952 | A1* | 6/2007 | Tsai | G02B 6/0046 362/561 |
| 2007/0147036 | A1* | 6/2007 | Sakai | G02B 6/0096 362/240 |
| 2009/0026388 | A1* | 1/2009 | Drozdowicz | G03F 7/70075 250/492.2 |
| 2009/0040787 | A1* | 2/2009 | Nagata | G02B 6/0028 362/619 |
| 2010/0157577 | A1* | 6/2010 | Montgomery | G02B 6/0018 362/97.2 |
| 2010/0238367 | A1* | 9/2010 | Montgomery | G02B 6/005 349/15 |
| 2011/0228195 | A1* | 9/2011 | Shikii | G02B 6/0031 349/62 |
| 2011/0242457 | A1* | 10/2011 | Lee | G02B 6/003 349/63 |

FOREIGN PATENT DOCUMENTS

| | | |
|---|---|---|
| CN | 101398569 A | 4/2009 |
| CN | 202056688 U | 11/2011 |
| CN | 202275180 U | 6/2012 |
| CN | 202955650 U | 5/2013 |

OTHER PUBLICATIONS

Second Chinese Office Action, for Chinese Patent Application No. 201410212128.4, dated Jun. 22, 2016, 8 pages.

Third Chinese Office Action, for Chinese Patent Application No. 201410212128.4, dated Nov. 30, 2016.

* cited by examiner

LIGHT GUIDE PLATE, DUAL-VIEW BACKLIGHT MODULE AND DUAL-VIEW DISPLAY DEVICE

CROSS-REFERENCE TO RELATED APPLICATION

This application claims the benefit of Chinese Patent Application No. 201410212128.4 filed on May 19, 2014 in the State Intellectual Property Office of China, the whole disclosure of which is incorporated herein by reference.

BACKGROUND OF THE INVENTION

Field of the Invention

Embodiments of the present invention relates to the technical field of display, and more particular, to a light guide plate, a dual-view backlight module having the light guide plate and a dual-view display device having the dual-view backlight module.

Description of the Related Art

A dual-view display is mainly used in a limited space. With the dual-view display, different images can be observed from different views by using a single screen. Since the dual-view display realizes the display function of two displays by using a single display, cost and installation space can be remarkably saved. Such display is mainly applied in vehicle display devices. The fundamental requirement of a display angle for the dual-view display is shown in FIG. 1. The visible view of the dual-view display is in a range of 22.5°-45°. The center of the visual field is optimally at 30°. Specific conditions are determined according to requirements for a backlight plate.

In the prior art, a backlight module of the dual-view display may be provided with a lower prism. However, a brightness enhancement effect realized by the low prism is bad, and thus a dual-view display with a high brightness cannot be realized.

SUMMARY OF THE INVENTION

In order to overcome the above mentioned and other technical problems in the prior art, the present invention provides a light guide plate, a dual-view backlight module having the light guide plate and a dual-view display device having the dual-view backlight module. With design of the present invention, the brightness enhancement effect can be improved, so that a dual-view display device with a high brightness can be manufactured.

According to embodiments of an aspect of the present invention, it provides a light guide plate, wherein a lower surface of the light guide plate includes at least one V-shaped groove configured to reflect a light ray, which is incident onto the lower surface of the light guide plate from sides of the light guide plate, onto an upper surface of the light guide plate by sides of the at least one V-shaped groove. Then, the reflected light ray leaves the light guide plate from the upper surface thereof.

According to embodiments of another aspect of the present invention, it provides a dual-view backlight module comprising the light guide plate described as above and two incidence units, wherein the two incidence units are located at two sides of the light guide plates and are configured to enable the light ray to enter the light guide plate from the two sides of the light guide plate, respectively. The light guide plate is used for reflecting the light ray, which is incident onto the lower surface of the light guide plate from the two sides of the light guide plate, onto the upper surface of the light guide plate by two sides of the V-shaped groove, respectively. Then, the reflected light ray leaves the light guide plate from the upper surface thereof so as to form dual-view backlight.

According to embodiments of a further aspect of the present invention, it provides a dual-view display device comprising the dual-view backlight module described as above.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EMBODIMENTS

Figure 1:
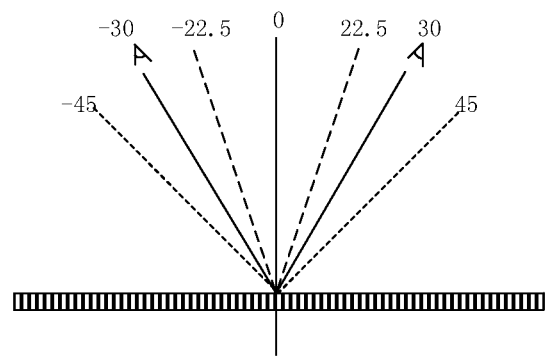
FIG. 1 is a schematic view showing a display view of a dual-view display.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein;

rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
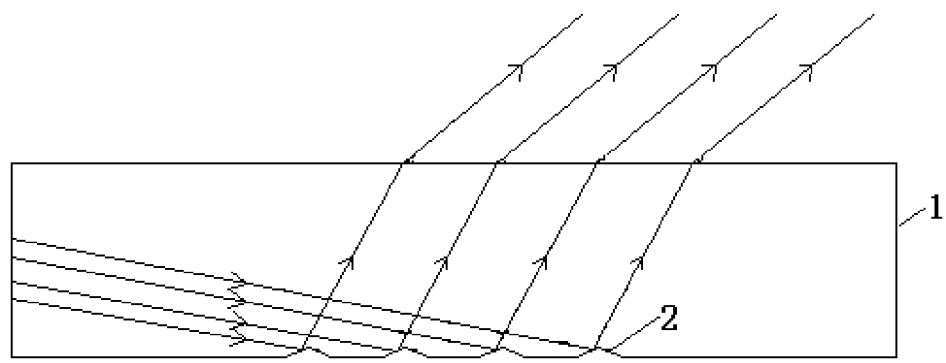
FIG. 2 is a schematic view of a basic structure of a light guide plate according to an embodiment of the present invention.

With reference to FIG. 2, in the light guide plate 1 according to an embodiment of the present invention, a lower surface of the light guide plate 1 includes at least one V-shaped groove 2 configured to reflect a light ray, which is incident onto the lower surface of the light guide plate from sides of the light guide plate, onto an upper surface of the light guide plate by sides of the at least one V-shaped groove 2. Then, the reflected light ray exits from the upper surface of the light guide plate.

Figure 3:
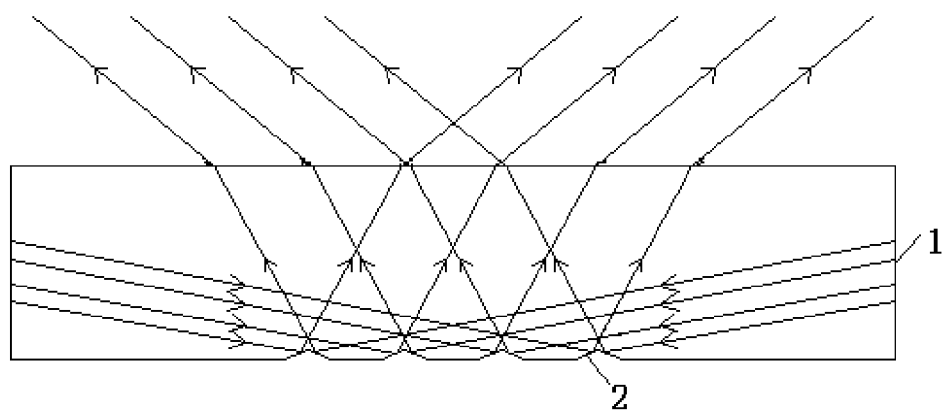
FIG. 3 is a schematic view showing reflection of light from different incidence directions by a V-shaped groove of the light guide plate according to an embodiment of the present invention.

In the present embodiment, since the V-shaped groove 2 has two sides, the light ray, which is incident onto the lower surface of the light guide plate from two ends of the light guide plate, can be reflected towards two different directions by the two sides of the V-shaped groove 2 respectively to correspond to two different views, as shown in FIG. 3. Therefore, such configuration can be employed in the field of dual-view display. Preferably, the two sides of the V-shaped groove 2 may be asymmetrical. That is, the angles between the respective sides of the V-shaped groove and the lower surface of the light guide plate are different from each other, so that the light ray, which enters the light guide plate from the two ends of the light guide plate, are reflected by the two sides of the V-shaped groove with different reflection angles. Thus, the exiting regions on the upper surface of the light guide plate for the reflected light ray are also different from each other, and the positions at which the exiting light ray will be observed can be changed to adapt to requirements of different observation regions in dual-view display.

Preferably, the angles between the two sides of the V-shaped groove 2 of the light guide plate 1 and the lower surface of the light guide plate are in a range of 10°-80°, thereby providing a good brightness enhancement effect.

Figure 4:
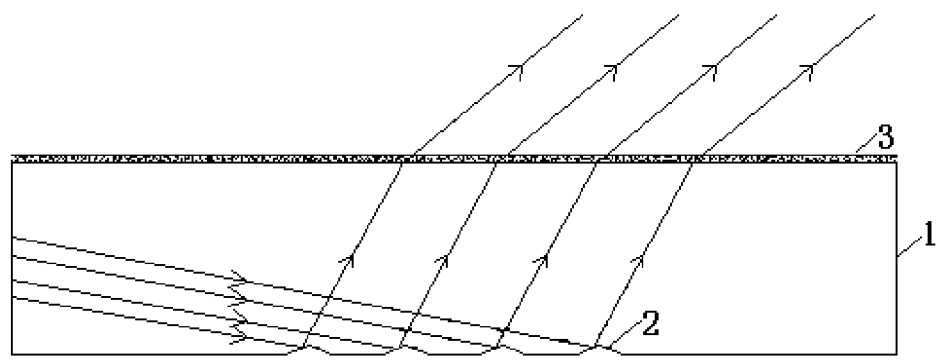
FIG. 4 is a schematic structural view showing a light guide plate according to another embodiment of the present invention.

Preferably, the upper surface of the light guide plate 1 may include a Gauss scattering film 3 configured to perform a Gauss scattering of the light ray exiting from the upper surface of the light guide plate so as to obtain a homogenized light ray, as shown in FIG. 4.

Figure 5:
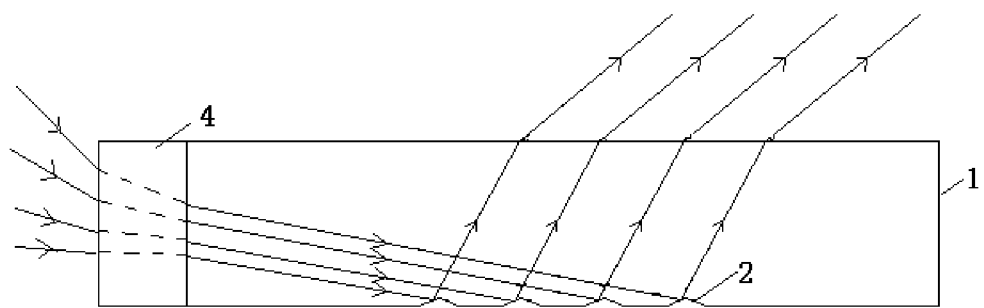
FIG. 5 is a schematic structural view showing a light guide plate according to a further embodiment of the present invention.

Preferably, the light guide plate 1 may further comprise a first concave lens/first concave lenses 4 provided at one side/two sides thereof and configured to refract the light ray that enters the light guide plate 1 from the sides of the light guide plate 1, so that the convergent light ray from the sides can be converted into parallel light ray to be incident onto the lower surface of the light guide plate 1, as shown in FIG. 5. The first concave lens 4 can refract all or most of the light ray from the sides of the light guide plate 1 onto the V-shaped groove 2 provided on the lower surface of the light guide plate 1, so that light transmission and emitting brightness of the light guide plate 1 can be enhanced.

Figure 6:
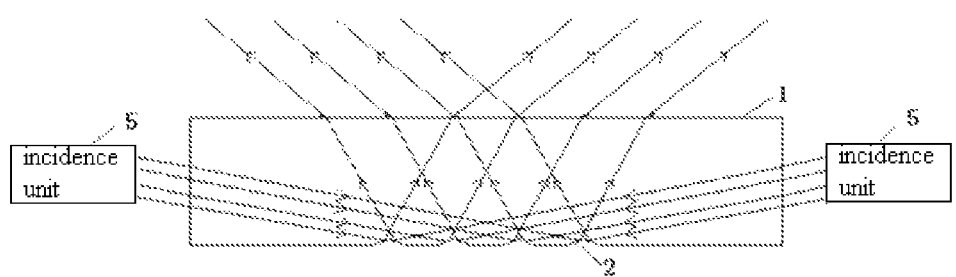
FIG. 6 is a schematic view of a basic structure of a dual-view backlight module having the light guide plate according to the embodiments of the present invention.

With reference to FIG. 6, the embodiments of the present invention also provide a dual-view backlight module comprising the light guide plate 1 as described above and two incidence units 5. The two incidence units 5 are provided at the two sides of the light guide plate 1, respectively, and are configured to enable the light ray to enter the light guide plate 1 from the two sides of the light guide plate 1, respectively. The light guide plate 1 is used for reflecting the light ray, which is incident onto the lower surface of the light guide plate from the two sides of the light guide plate 1, onto the upper surface of the light guide plate by the two sides of the V-shaped groove 2, respectively, thereby forming dual-view backlight.

Next, the dual-view backlight modules according to several specific examples of the embodiments of the present invention will be described in details so as to provide a clear understanding of the inventive concept of the present invention for one skilled in the art.

Example 1

Figure 7:
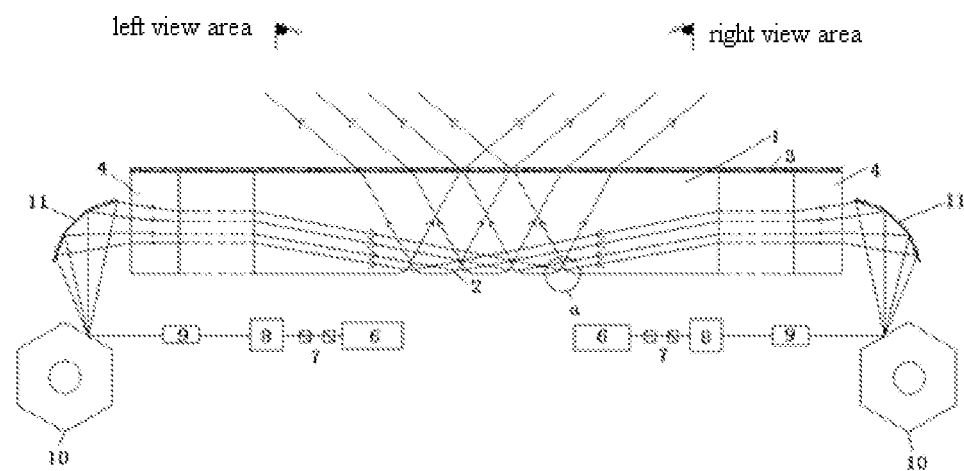
FIG. 7 is a schematic structural view of a dual-view backlight module according to Example 1 of the embodiments of the present invention.

With reference to FIG. 7, the dual-view backlight module according to Example 1 comprises a laser source 6, a set of beam-splitting prisms 7, a cylindrical lens 8, a third convex lens 9, a polygon mirror 10, a curved mirror 11 and a light guide plate 1. The light guide plate 1 may comprise a V-shaped groove 2/V-shaped grooves 2 and a Gauss scattering film 3 and may be provided at the two sides thereof with the first concave lenses 4. In the present example, the laser source 6, the set of beam-splitting prisms 7, the cylindrical lens 8, the third convex lens 9, the polygon mirror 10 and the curved mirror 11 constitute the incidence unit 5 in Example 1.

Figure 8:
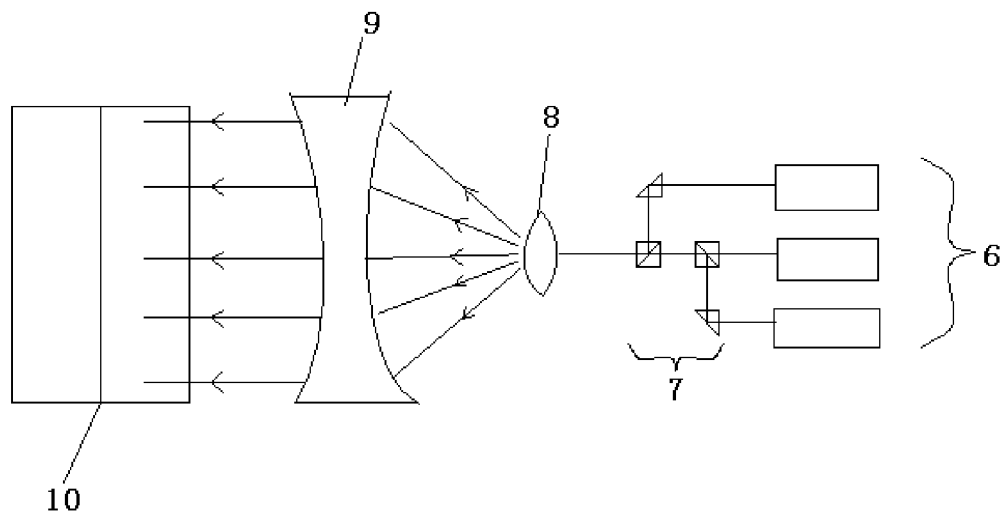
FIG. 8 is an optical path diagram of a laser source of the dual-view backlight module according to Example 1 of the embodiments of the present invention.

In Example 1, the laser source 6 includes three monochromatic sources with red, green and blue (RGB) colors, respectively, as shown in FIG. 8. The emitted light ray is combined into a single beam of light after passing through the set of beam-splitting prisms 7 and then is incident onto the cylindrical lens 8. The set of beam-splitting prisms 7 include two total reflection prisms and two beam-splitting prisms. The beam-splitting prisms can split or converge light waves having different wavelengths. After being diffused by the cylindrical lens 8 and being converged by the third convex lens 9, the resulting light ray, in the form of parallel light beam, is incident onto the surfaces of the polygon mirror 10, and then is reflected by the surfaces of the polygon mirror 10 onto the curved mirror 11.

Figure 9:
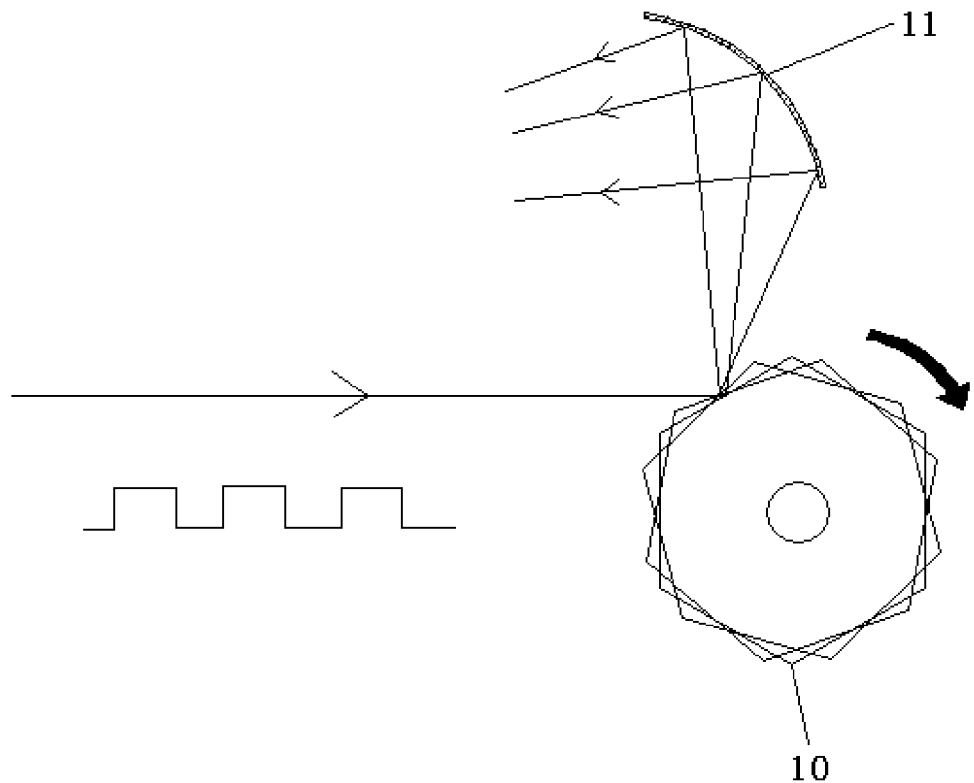
FIG. 9 is a schematic view of pulsed square wave reflection of the dual-view backlight module according to Example 1 of the embodiments of the present invention.

With reference to FIG. 9, the light emitted from the laser source 6 may be incident, in the form of pulses, onto the surfaces of the polygon mirror 10. By means of rotation of its central rotation axis, the polygon mirror 10 allows the reflection angle of the light ray, which is incident onto the surfaces of the polygon mirror 10, to be changed over time, so that the reflected light ray is incident at different positions on the surface of the curved mirror 11 over time. Since the curvatures at the different position on the surface of the curved mirror 11 are different from one another, the reflected light ray at different positions on the surface of the curved mirror 11 may be incident into the interior of the light guide plate 1 with different angles and heights in different periods. In this example, the polygon mirror 11 is a hexagon mirror or an octagon mirror and rotates about its axis. The outer surfaces of the polygon mirror are reflection surfaces configured to effectively reflect the light ray.

Figure 10:
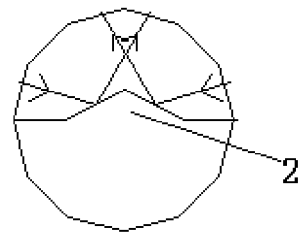
FIG. 10 is an enlarged view of portion A of Example 1 shown in FIG. 7, showing a schematic view of reflection of the V-shaped groove of the light guide plate included in the dual-view backlight module according to Example 1 of the embodiments of the present invention.

In use, the light ray is incident onto the left and right surfaces of the V-shaped groove 2 on the lower surface of the light guide plate through the first concave lenses 4 provided at the two sides of the light guide plate 1, and then is reflected to the upper surface with the same reflection angle. FIG. 10 is an enlarged view of portion A of FIG. 7, showing the reflection of the light ray. If the V-shaped groove 2 is asymmetrical, the incident light ray, which is incident onto the left surface of the V-shaped groove 2 from the two sides of the light guide plate 1, is reflected with a different reflection angle from the reflection angle of the incident light ray which is incident onto the right surface of the V-shaped groove 2 from the two sides of the light guide plate 1.

Figure 11:
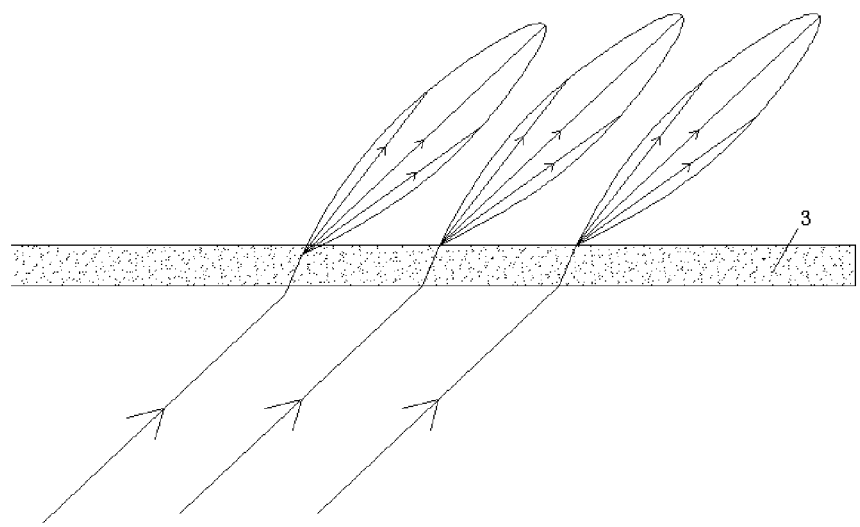
FIG. 11 is a schematic view of the light ray scattered by a Gauss scattering film of the light guide plate included in the dual-view backlight module according to Example 1 of the embodiments of the present invention.

When the light ray leaves the upper surface of the light guide plate 1, it passes through the Gauss scattering film 3. The Gauss scattering film 3 slightly scatters the light ray in the manner of Gauss scattering to enhance homogenization of the backlight and extend the observation regions, with reference to FIG. 11. By means of simultaneous scanning illumination of the sources provided at the left and right sides of the light guide plate 1, the backlight module according to Example 1 will provide the emitting light ray having different emitting angles so as to form a dual-view backlight.

Example 2

Figure 12:
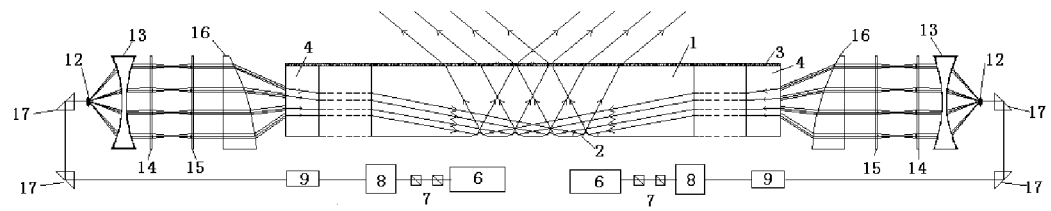
FIG. 12 is a schematic structural view of a dual-view backlight module according to Example 2 of the embodiments of the present invention.

With reference to FIG. 12, Example 2 provides a dual-view backlight module using a compound eye lens system. Compared with Example 1, the present example splits the light ray into respective light beams, focuses the respective light beams and then collimates the respective light beams for exiting by using a cylindrical lens 12, a second concave lens 13 and two compound eye lenses 14, 15. Then, the respective collimated light beams are effectively introduced into the light guide plate 1 by using a refractive lens 16 and are incident onto the V-shaped groove 2 on the lower surface of the light guide plate 1. The structure according to the present example 2 can effectively split the light ray into light beams and collimate the light beams. Such collimation effect is much better than the collimation effect obtained only by using lenses. Further, the present example also uses a total reflection prism 17 to reflect the light ray emitted by the laser source 6 so as to redirect the light ray.

Example 3

Figure 13:
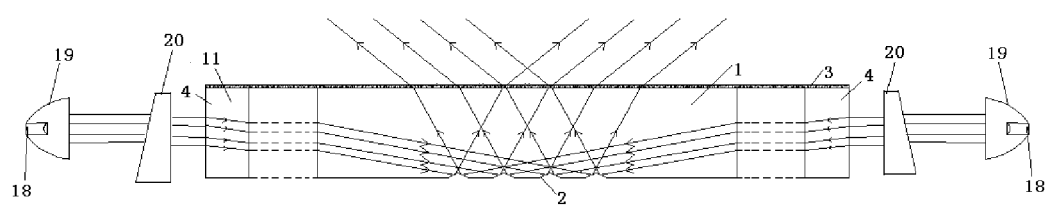
FIG. 13 is a schematic structural view of a dual-view backlight module according to Example 3 of the embodiments of the present invention.

With reference to FIG. 13, Example 3 provides a dual-view backlight module having a luminous light source using Lambert-type light distribution. Compared with Example 1, the present example employs a point light source 18 using Lambert-type light distribution and collimates the dispersed light ray emitted by the point light source 18 by an optical collimator 19. After passing through the optical collimator 19, the light ray is converted into a surface light source and is incident, in the form of parallel light, onto a refraction prism 20. The refraction prism 20 deflects the light ray which then is incident into the inside of the light guide plate 1, thereby realizing illumination at the sides of the V-shaped groove 2. When illumination at the two sides of the V-shaped groove 2 is realized, a dual-view backlight can be obtained.

Compared with Example 1 and Example 2, such structure provides a worse light ray alignment effect and stray light phenomenon is more significant. However, the present example has a simple and compact structure and can save an installation space.

The embodiments of the present invention also provide a dual-view display device including the dual-view backlight module as described in any one of the above embodiments or examples. The display device may be any product or component which provides any display function, such as an electric paper, a mobile phone, a tablet PC, a TV, a display, a notebook computer, a digital picture frame, a navigator and the like.

With the embodiments of the present invention, at least the following advantages can be achieved:

In the light guide plate, the dual-view backlight module and the dual-view display device according to the embodiments of the present invention, the V-shaped groove on the light guide plate can reflect the light ray which enters the light guide plate from the two sides of the light guide plate, so that the light ray, which leaves the upper surface of the light guide plate, can form a dual-view backlight. With such design, the embodiments of the present invention provide a good brightness enhancement effect and can be applied to manufacture a dual-view display having a high brightness.

It should be noted that the above described embodiments are preferred embodiments of the present invention only and are not intended to limit the present invention. It would be appreciated by those skilled in the art that various changes and substitutions may be made without departing from the principle and spirit of the disclosure. Such changes and substitutions fall within the scope of the disclosure.

What is claimed is:

1. A backlight module including at least one light source and a light guide plate, wherein a lower surface of the light guide plate includes at least one V-shaped groove configured to reflect a light ray, which is incident onto the lower surface of the light guide plate from sides of the light guide plate, onto an upper surface of the light guide plate by sides of the at least one V-shaped groove, the reflected light ray leaving the light guide plate from the upper surface thereof;

wherein the angles between the two sides of the V-shaped groove of the light guide plate and the lower surface of the light guide plate are in a range of 10°-80°; and wherein the light guide plate further comprises a first concave lens/first concave lenses provided at one side/two sides thereof and configured to convert substantially all of a convergent light ray from the at least one light source, which enters the light guide plate from the one side/two sides of the light guide plate, into a mutually parallel light ray to be incident onto the lower surface of the light guide plate.

2. The backlight module according to claim 1, wherein the angles between the two sides of the V-shaped groove and the lower surface of the light guide plate are different from each other.

3. The light guide plate according to claim 1, wherein the upper surface of the light guide plate further comprises a Gauss scattering film configured to perform a Gauss scattering of the light ray exiting from the upper surface of the light guide plate.

4. The backlight module of claim 1, wherein the backlight module is a dual-view backlight module comprising:

two incidence units, wherein the two incidence units are located at two sides of the light guide plate and are configured to enable the light ray to enter the light guide plate from the two sides of the light guide plate, respectively, and wherein the light guide plate is used for reflecting the light ray, which is incident onto the lower surface of the light guide plate from the two sides of the light guide plate, onto the upper surface of the light guide plate by two sides of the V-shaped groove, respectively, the reflected light ray leaving the light guide plate from the upper surface thereof so as to form dual-view backlight.

5. The backlight module according to claim 4, wherein each incidence unit comprises a respective light source, a respective polygon mirror and a respective curved mirror, and wherein the respective light source is configured to emit parallel light to the respective polygon mirror, and the respective polygon mirror rotates about its central rotation axis and is configured to reflect the incident light ray at different moments onto different positions on the respective curved mirror, and the respective curved mirror is configured to reflect the light ray reflected by the respective polygon mirror onto the sides of the light guide plate.

6. The backlight module according to claim 4, wherein each incidence unit comprises a respective light source, a respective cylindrical lens, a respective second concave lens, a respective first compound eye lens, a respective second compound eye lens and a respective refractive lens, and wherein the respective light source is configured to emit a parallel light beam which passes through the respective cylindrical lens, the respective second concave lens, the respective first compound eye lens and the respective second compound eye lens and is converted into split and collimated light beams, and the split and collimated light beams are refracted by the respective refractive lens and then are incident into the light guide plate from the sides thereof.

7. The backlight module according to claim 5, wherein the respective light source of each incidence unit further comprises three respective monochromatic laser sources, a respective set of beam-splitting prisms, a respective cylindrical lens and a respective third convex lens, and wherein the respective three monochromatic laser sources are configured to emit red, green and blue monochromatic lasers, respectively, and the respective set of beam-splitting prisms combines the red, green and blue monochromatic lasers into a single beam of light ray to be incident onto the respective cylindrical lens by means of two respective total reflection prisms and two respective beam splitting prisms, and wherein the respective cylindrical lens is configured to expand the incident light ray, and the respective third convex lens is configured to converge the expanded light ray into a parallel light beam.

8. The backlight module according to claim 5, wherein the angles between the two sides of the V-shaped groove and the lower surface of the light guide plate are different from each other.

9. The backlight module according to claim 6, wherein the respective light source of each incidence unit further comprises three respective monochromatic laser sources, a respective set of beam-splitting prisms, a respective second cylindrical lens and a respective third convex lens, and wherein the respective three monochromatic laser sources are configured to emit red, green and blue monochromatic lasers, respectively, and the respective set of beam-splitting prisms combines the red, green and blue monochromatic lasers into a single beam of light ray to be incident onto the respective second cylindrical lens by means of two respective total reflection prisms and two respective beam splitting prisms, and wherein the respective second cylindrical lens is configured to expand the incident light ray, and the respective third convex lens is configured to converge the expanded light ray into a parallel light beam.

10. The backlight module according to claim 6, wherein the angles between the two sides of the V-shaped groove and the lower surface of the light guide plate are different from each other.

11. The backlight module according to claim 4, wherein each incidence unit comprises a respective collimated surface luminous light source and a respective refraction prism, and wherein the respective refraction prism is configured to refract the parallel light emitted from the respective collimated surface luminous light source and then the refracted parallel light is incident into the light guide plate from the sides thereof.

12. The backlight module according to claim 11, wherein the angles between the two sides of the V-shaped groove and the lower surface of the light guide plate are different from each other.

13. A dual-view display device comprising the backlight module according to claim 6.

14. The dual-view display device according to claim 13, wherein each incidence unit comprises a respective light source, a respective polygon mirror and a respective curved mirror, the respective light source is configured to emit parallel light to the respective polygon mirror, and the respective polygon mirror rotates about its central rotation axis and is configured to reflect the incident light ray at different moments onto different positions on the respective curved mirror, and the respective curved mirror is configured to reflect the light ray reflected by the respective polygon mirror onto the sides of the light guide plate.

15. The dual-view display device according to claim 13, wherein each incidence unit comprises a respective light source, a respective cylindrical lens, a respective second concave lens, a respective first compound eye lens, a respective second compound eye lens and a respective curved mirror, and wherein the respective light source is configured to emit a parallel light beam which passes through the respective cylindrical lens, the respective second concave lens, the respective first compound eye lens and the respective second compound eye lens and is converted into split and collimated light beams, and the split and collimated light beams are refracted by the respective refractive lens and then are incident into the light guide plate from the sides thereof.

16. The dual-view display device according to claim 13, wherein each incidence unit comprises a respective collimated surface luminous light source and a respective refraction prism, and wherein the respective refraction prism is configured to refract the parallel light emitted from the respective collimated surface luminous light source and then the refracted parallel light is incident into the light guide plate from the sides thereof.

* * * * *